March 29, 1966 P. G. REBECHINI ETAL 3,243,130
WIRE WRAPPING TOOL
Filed Jan. 24, 1963 2 Sheets-Sheet 1
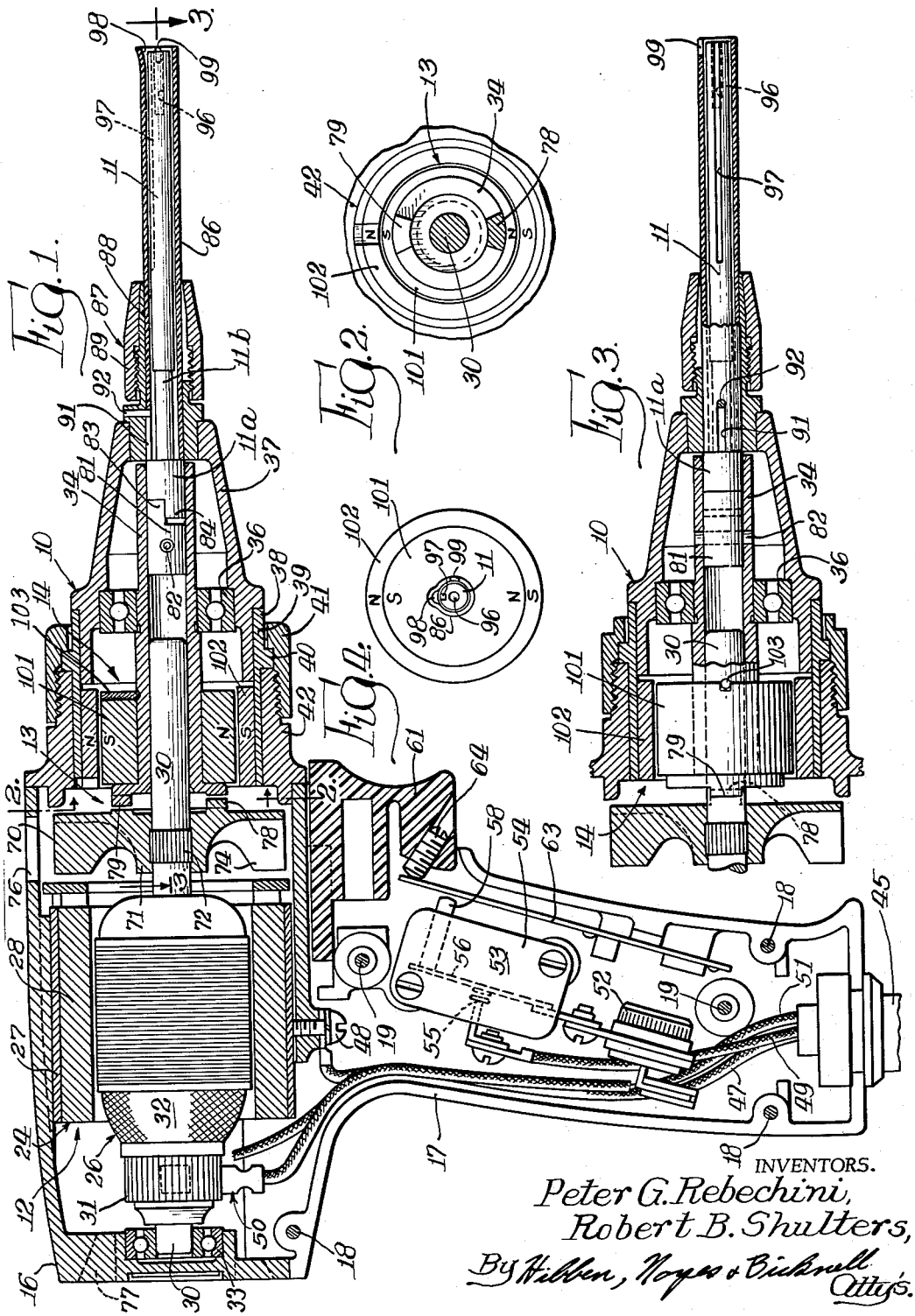
INVENTORS.
Peter G. Rebechini,
Robert B. Shulters,
By Hibben, Noyes & Bicknell
Attys.

March 29, 1966 P. G. REBECHINI ETAL 3,243,130
WIRE WRAPPING TOOL
Filed Jan. 24, 1963 2 Sheets-Sheet 2
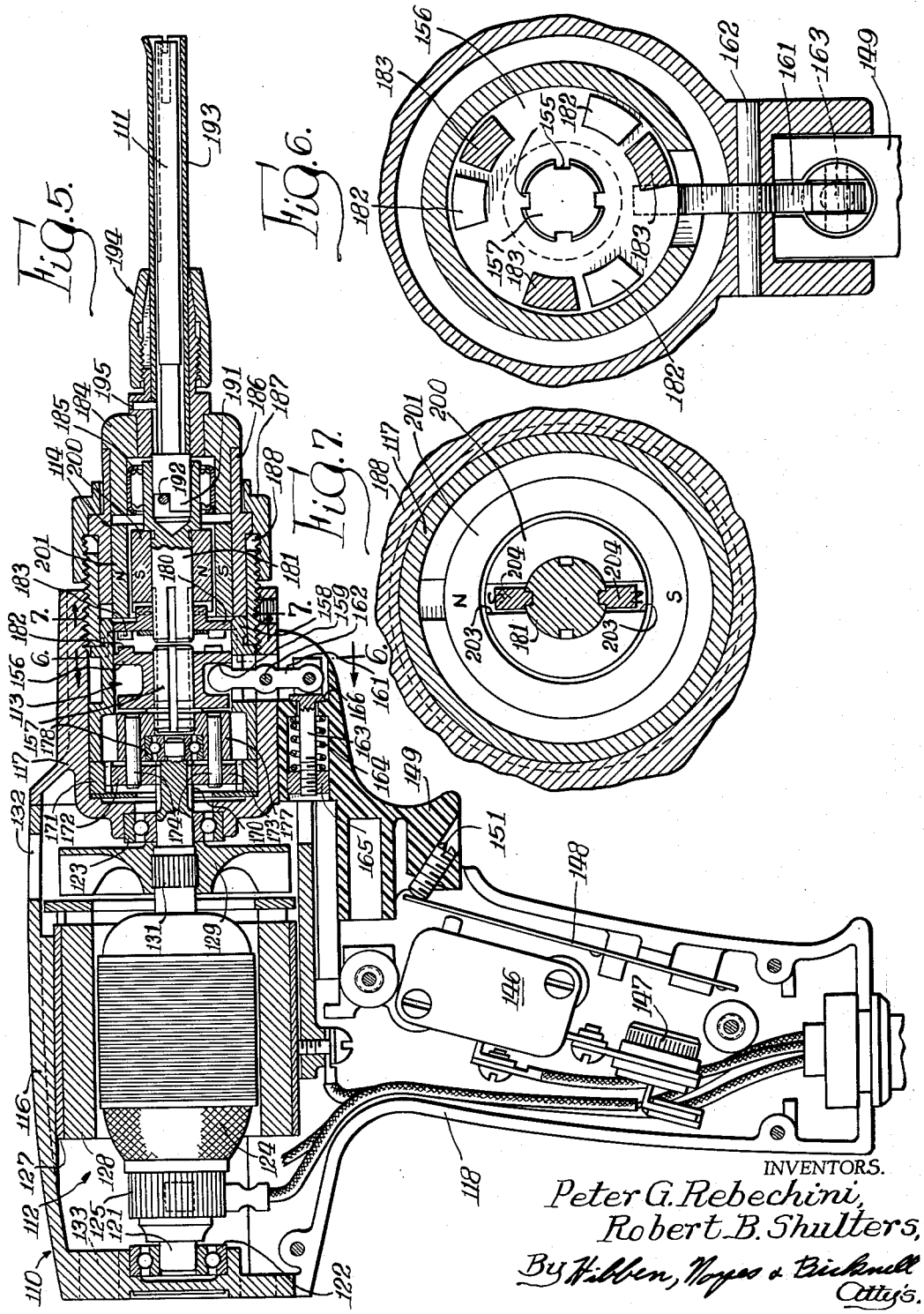
INVENTORS.
Peter G. Rebechini,
Robert B. Shulters,
By Hibben, Noyes & Bicknell
Atty's.

United States Patent Office 3,243,130
Patented Mar. 29, 1966

3,243,130
WIRE WRAPPING TOOL
Peter G. Rebechini, Aurora, and Robert B. Shulters, Batavia, Ill., assignors to Thor Power Tool Company, Aurora, Ill., a corporation of Delaware
Filed Jan. 24, 1963, Ser. No. 253,578
2 Claims. (Cl. 242—7)

This invention relates to tools, and, more particularly, to a tool having a mechanism for restoring a work engaging member to a starting position at the conclusion of an operation.

Numerous tools on the market include a member adapted to engage a work piece and perform an operation on the work piece upon energization of the tool. Screw drivers, nut setters, and wire wrappers are examples of tools of this type, wherein the work engaging member is rotary and a motor is usually provided to rotate the member.

Frequently, it is desirable to have the work engaging member at a starting position prior to each operation. For example, a common type of wire wrapping tool, which connects a wire to a terminal by wrapping the wire around the terminal, includes a mandrel rotatably mounted within a sleeve on a housing, the forward ends of the mandrel and the sleeve being adapted to engage the wire and wrap it around the terminal when the mandrel is rotated relative to the sleeve. A power unit, such as an electric motor, may be mounted on the housing and connected to rotate the mandrel upon energization. Due to the construction of the forward ends of the mandrel and the sleeve, there is a certain position of the mandrel relative to the sleeve, referred to as the starting position, at which it is preferred to have the mandrel at the start of each wire wrapping operation. It has been proposed to provide a wire wrapping tool having means for bringing the mandrel to this starting position when the motor is denergized, but the proposed construction is disadvantageous primarily because friction and inertia prevents this means from operating properly, and because of the likelihood of wear and failure of the parts of the tool.

Accordingly, it is a primary object of this invention to provide a tool including novel indexing means for placing the tool in a starting position prior to each operation.

It is another object to provide a tool of the foregoing character, including a novel clutch which minimizes the effect of friction and inertia of a power unit of the tool on the operation of the indexing means.

Still another object is to provide a tool of the foregoing character, which is simple and rugged in construction.

Other objects and advantages of the invention will become apparent from the following description taken in conjunction with the accompanying figures of the drawings, in which:

FIG. 1 is a longitudinal sectional view of a wire wrapping tool embodying the invention;

FIG. 2 is a transverse sectional view taken on the line 2—2 of FIG. 1;

FIG. 3 is a horizontal sectional view taken on line 3—3 of FIG. 1;

FIG. 4 is a schematic drawing illustrating the operation of the tool;

FIG. 5 is a longitudinal sectional view showing an alternative form of the invention;

FIG. 6 is an enlarged transverse sectional view taken on the line 6—6 of FIG. 5; and FIG. 7 is an enlarged transverse sectional view taken on the line 7—7 of FIG. 5.

In general, a wire wrapping tool embodying the invention comprises a housing including a tubular sleeve, and a mandrel rotatably mounted on the housing within the sleeve. The forward end of the sleeve and the mandrel are shaped to engage a wire and wrap it around a terminal when the mandrel is rotated relative to the sleeve by a motor, also mounted on the housing.

The mandrel is brought to a starting position relative to the sleeve prior to each wire wrapping operation by an indexing means, which includes a rotatable magnet secured to the mandrel and a stationary magnet secured to the housing. The rotatable magnet is urged to a rest position due to the forces of attraction and repulsion of the poles of the two magnets, and the magnetic poles are arranged such that the rest position of the rotatable magnet coincides with the starting position of the mandrel.

To prevent friction and inertia of the drive motor from affecting the operation of the indexing means in moving the mandrel to its starting position, the motor is coupled to the mandrel through a clutch mechanism which may uncouple the motor from the mandrel upon deenergization of the motor.

In greater detail, a wire wrapping tool embodying the invention comprises a pistol shaped housing 10 (FIGS. 1 and 3), a shaft or mandrel 11 rotatably mounted on the housing 10, a drive unit or motor 12 mounted on the housing 10 for rotating the mandrel 11, a clutch 13 for coupling the mandrel 11 to the motor 12, and a magnetic indexing means 14 for bringing the mandrel 11 to a starting position relative to a portion of the housing 10 upon deenergization of the motor 12.

The housing 10 comprises a generally cylindrical field housing 16 which is preferably made of metal and encloses the motor 12, and a handle or grip 17 which may be made of plastic and is secured to the field housing 16. The grip 17 may include two halves (one shown in FIG. 1) held together by a plurality of dowels 18 and screws 19, and the grip 17 may be secured to the field housing 16 by screws (not shown).

The motor 12 comprises a permanent magnet stator 24 secured to the field housing 16, and an armature assembly 26 rotatably mounted on the field housing 16. The stator 24 includes a sleeve 27, which may be made of a magnetic material, secured to the field housing 16 as by a press fit, and a permanent magnet 28 which is supported by the sleeve 27. The armature assembly 26 of the motor 12 includes an armature shaft 30 which supports a commutator 31 and suitable armature windings and laminations 32, the outer periphery of the armature windings and laminations 32 being separated from the poles of the parmanent magnet 28 of the stator by a small air gap.

The rearward or left end, as shown in FIG. 1, of the armature shaft 30 is rotatably supported by a ball bearing assembly 33, the outer race of the bearing assembly 33 being secured to the field housing 16 and the inner race being secured to the shaft 30. The forward end of the armature shaft 30 is supported by a tubular spindle 34, to be described in greater detail hereinafter. The shaft extends inside of the spindle 34 in free running fit relation. The spindle 34 is rotatably supported by another ball bearing assembly 36 which has its inner race secured to the outer periphery of the spindle 34 and its outer race secured to a bearing housing 37, which forms part of the tool housing 10. This bearing housing 37 is secured to the field housing 16 by means of cylindrical sleeve 38, a clamp nut 41, and a front plate 42. The bearing housing 37 and the sleeve 38 are preferably secured together by a press fit and the front plate 42 is preferably secured to the field housing 16 by a plurality of screws (not shown). The clamp nut 41 is threaded to the front plate 42 and it has an inwardly extending flange 39 which engages an annular rib 40 formed on the outer periphery of the sleeve 38. By this construction the sleeve 38 and the bearing housing 37 may be rotated relative to the field housing 16 simply by loosening the clamp nut 41.

Electrical power is connected to the motor 12 by means of a three wire cord 45 which extends through an opening formed in the bottom of the grip 17. One wire 47 of the three wire cord 45 is secured by a screw 48 to the metal field housing 16 in order to ground the tool. The motor 12 is energized through the other two wires 49 and 51, which are connected across a brush assembly 50 through a rectifier 52 and a normally open switch 53. This switch 53 is a conventional type and may include a casing 54 secured to the grip 17 as by screws, a stationary contact 55 mounted in the casing and connected to one of the wires 49 and 51, and a spring contact 56 mounted on the casing and connected to the other of the wires. The switch 53 may be closed by button 58 which is slidably mounted on the casing 54 and is positioned to engage and force the spring contact 56 into engagement with the stationary contact 55 when it is pressed into the casing 54.

The switch may be closed by a trigger 61 which is slidably mounted on the grip 17. A flexible leaf 63 has its lower end secured to the grip 17 and its upper end positioned between the button 58 of the switch 53 and the trigger 61, this leaf 63 urging the trigger 61 toward the right as shown in FIG. 1 away from the switch 53. When the trigger 61 is squeezed by an operator of the tool the leaf 63 is forced toward the left into engagement with the button 58 of the switch 53 and causes the switch 53 to close. When pressure on the trigger 61 is released by the operator, the leaf 63 returns it to the position shown in FIG. 1. A set screw 64 may be provided on the trigger 61 to vary the point at which the trigger 61 closes the switch 53.

As previously mentioned, the motor 12 is connected to the mandrel 11 by means of the clutch 13, which includes a fan 70 secured to the armature shaft 30 and the tubular spindle 34 positioned around the right end of the armature shaft 30. The fan 70 includes a hub 71 which is pressed onto the armature shaft 30 and prevented from turning relative to the shaft 30 by a straight splined portion 72 of the shaft 30. The fan 70 which has a plurality of outwardly extending blades 74 rotates with the armature shaft 30 and the blades 74 cause cooling air to flow around the motor armature assembly. This cooling air enters the field housing 16 through openings 77 at the rearward end of the field housing and leaves the housing through openings 76 adjacent the fan 70.

On the forward side of the fan hub 71 is formed an axially extending clutch jaw 78 of a lost motion clutch, which is engageable with an axially extending clutch jaw 79 on the rearward end of the spindle 34. The fan 70 and the jaw 78 thus form a driving clutch member and the spindle 34 and the jaw 79 form a driven clutch member.

Each clutch member is provided with one clutch jaw and, as shown in FIG. 2, each jaw extends over an arc of approximately 35°. When the motor 12 is deenergized, the two jaws are usually angularly displaced from each other, although they may engage each other. Assuming the former condition, when the motor 12 is initially energized, the clutch jaw 78 of the fan 70 will rotate a partial revolution before engaging and driving the jaw 79 of the spindle 34. The greatest extent of independent rotation of clutch jaw 78 prior to engagement will be in the neighborhood of 290°. In the case where the jaws 78 and 79 are initially engaged, they will being to rotate simultaneously.

While one clutch jaw has been shown on each clutch member, it will be understood that more than one may be provided. Additional clutch jaws would reduce the angular separation between adjacent clutch jaws and the maximum amount of rotation required of the driving clutch member before the jaws of the two clutch members engage.

To couple the spindle 34 to the mandrel 11, a plug 81 is mounted within the spindle 34 adjacent its forward end but secured thereto by a pin 82. A tang 83 is formed on the forward end of the plug 81, which engages a tang 84 formed on the enlarged rearward end 11a of the mandrel 11, the two tangs 83 and 84 being semicircular in cross section. The mandrel 11 is mounted for rotation within a sleeve 86 which is held by a chuck 87. The chuck 87 includes a slotted collet 88 secured to the bearing surface housing 37 as by a press fit, and a clamp nut 89 threaded onto the collet 88. The sleeve 86 extends into the collet 88 and is secured thereto by tightening the clamp nut 89, which action compresses the slotted collet 88. The rearward end of the sleeve 86 has a slot 91 formed in it, and a pin 92 extends through an opening in the collet 88 and into the slot 91, the slot 91 and the pin 92 preventing the sleeve 86 from rotating relative to the chuck 87.

To prevent movement of the mandrel 11 out of the sleeve 86, the diameter of the rearward end 11a of the mandrel 11 is made larger than the internal diameter of the sleeve 86 and it is seated against the rearward end of the sleeve 86. However, the diameter of the mandrel 11 adjacent the pin 92 is reduced as at 11b and the remainder of the mandrel 11 is sized to permit it to rotate freely within the sleeve 86.

The forward ends of the mandrel 11 and the sleeve 86 are shaped to engage a wire and wrap it around a terminal when the mandrel 11 is rotated relative to the sleeve 86. To this end, a hole 96 is formed at the center of the mandrel 11, which receives a terminal, and an axially extending slot 97 is formed in the outer periphery of the mandrel 11, which receives the end of a wire to be wrapped around the terminal. A portion 98 of the sleeve 86 is flared outwardly at its forward end, as shown in FIG. 1 and 4, and a notch 99 is also formed in the sleeve 86 at this end, the flared portion 98 and the notch 99 being displaced by an angle of approximately 90° For the convenience of an operator of the tool and to increase the speed of operation, the slot 97 in the mandrel 11 is preferably adjacent the flared portion 98 of the sleeve 86 at the start of each wrapping operation. The indexing means 14 is provided to move the mandrel 11 to this starting position when the motor 12 is deenergized.

The indexing means 14 comprises a pair of annular concentric magnets, one a rotatable or inner magnet 101 secured to the outer periphery of the spindle 34 as by a pin 103 and the other a stationary or outer magnet 102 secured to the inner periphery of the sleeve 38. With reference to the schematic view of FIG. 4, the inner magnet 101 is polarized such that its magnetic poles are at its outer periphery and on opposite sides, and each pole extends over an arc of approximately 160°. The outer magnet 102 is similarly polarized with the exception that its magnetic poles are on its inner periphery. In accordance with well known magnetic field theory, the inner magnet 101 is urged toward a rest position where the north magnetic pole of one magnet is adjacent the south magnetic pole of the other magnet. The inner magnet 101 has a fixed angular relation with the mandrel 11 and the outer magnet 102 has a fixed angular relation with the sleeve 86, and, as shown in FIG. 4, the magnets are mounted such that the mandrel 11 is at its starting position relative to the sleeve 86 when the inner magnet 101 is at its rest position relative to the outer magnet 102.

To wrap a wire around a terminal using the tool, the operator positions the tool so that the terminal extends into the hole 96 of the shaft 11. Because of the attraction and repulsion of the magnetic poles of the magnets 101 and 102, the slot 97 of the shaft 11 is positioned adjacent the flared portion 98 of the sleeve, this facilitating the insertion of an end of the wire into the slot 97 after which it is hooked in the notch 99 of the sleeve 86.

The motor 12 is then energized by squeezing the trigger 61 which closes the switch 53. The resulting rotation of the armature shaft 30 causes the fan 70 to rotate, and the clutch jaw 78 after a partial revolution engages the clutch jaw 79 causing rotation of the spindle 34 and the mandrel 11. The motor 12 easily overcomes the forces of attraction and repulsion of the poles of the magnets 101 and 102. The rotating mandrel 11 then winds the wire around the terminal in a well known manner. After the wire winding operation is completed, the operator releases pressure on the trigger 61 to thereby deenergize the motor 12. Upon deenergization of the motor, the armature assembly 24 and the spindle 34 decelerate at different rates because of the differences in their relative masses and because of the attraction and repulsion of the poles of the magnets 101 and 102. The spindle 34 may momentarily come to a stop at the rest position of the inner magnet 101 while the motor armature is still rotating, in which case the clutch jaw 78 will again engage the clutch jaw 79. The inertia of the motor armature may then move the spindle 34 ahead again against the force of the magnets 101 and 102 and this movement may continue until the magnets are just pass the point where like magnetic poles are adjacent each other. Then the spindle 34 will rotate at a faster rate than the motor armature and again stop at the rest position of the inner magnet 101. This sequence continues until the inertial force of the motor armature can no longer overcome the force of the magnets, and the magnets 101 and 102 hold the spindle 34 at the point where the inner magnet 101 is at its rest position and the mandrel 11 is at its starting position. When so stopped, the slot 97 of the mandrel 11 is properly aligned with the flared portion 98 of the sleeve 86 for reception of a wire to be wrapped on the next operation.

Further, as to operation of the indexing means upon deenergization of the motor it is to be understood that when the deceleration has reduced the inertia forces of the armature to an extent such that the armature cannot overcome the restoring forces of the magnets 101 and 102, then the magnets 101 and 102 may reverse the direction of rotation of the armature and return the mandrel to its rest position.

When the clutch jaws 78 and 79 are out of engagement, the motor 12 is disconnected from the spindle 34, so that any friction or inertia of the motor 12 cannot affect the operation of the indexing means 14. The spindle 34 and the other parts connected for rotation with the inner magnet 101 are relatively light weight, so that the inner magnet 101 is able to move to its rest position without difficulty. The indexing means 14 is also advantageous because there is no friction due to sliding engagement between two parts, and there are no parts that are likely to wear out. Further, the lost motion clutch is advantageous because there is a direct driving connection between the motor 12 and the mandrel 11 when the motor is energized even though they may be disconnected when the motor is deenergized.

The angular position of the sleeve 86 relative to the field housing 16 may be changed for the convenience of the tool operator simply by loosening the clamp nut 41 and rotating the bearing housing 37 relative to the front plate 42. Such an adjustment will not change the angular relation between the shaft 11 and the sleeve 86, however, because the inner magnet 101 follows the outer magnet 102 and causes the spindle 34 and the mandrel 11 to rotate with the sleeve 86 and the bearing housing 37.

In FIG. 5 is shown an alternative construction of the wire wrapping tool. This tool comprises a housing 110, a mandrel 111 rotatably mounted on the housing 110, a motor 112 for rotating the mandrel 111, a clutch assembly 113 for coupling the motor 112 to the mandrel 111, and a magnetic indexing device 114 for moving the mandrel 111 to a starting position relative to a portion of the housing 110 prior to each wrapping operation.

The housing 110 is generally the same as the housing 10 illustrated in FIGS. 1 and 2, and comprises a field housing 116, a clutch housing 117 secured to the forward end of the field housing 116, and a grip 118 secured to the field housing 116.

The motor 112 may also be generally similar to the motor 12 shown in FIG. 1, and comprises an armature shaft 121 rotatably mounted at its rearward end on the field housing 116 by a ball bearing assembly 122 and rotatably mounted at its forward end on the clutch housing 117 by another ball bearing assembly 123. An armature assembly 124 is secured to the shaft 121, and a commutator assembly 125 is also secured to the armature shaft 121 between the armature assembly 124 and the ball bearing assembly 122. A stator comprising a sleeve 127 and a permanent magnet 128 is mounted on the field housing 116 around the armature assembly 124.

A fan 129 is preferably secured to the armature shaft 121 between the ball bearing assembly 123 and the armature assembly 124 by a splined portion 131 of the shaft 121. This fan also includes blades which draw air into the field housing 116 through openings 133 and force the air forwardly past the armature assembly 124 and out of the field housing 116 through openings 132 formed at its forward end.

Means for connecting electrical power to the drive motor 112 may be identical with the corresponding means shown in FIG. 1. This means may comprise a switch 146 and a rectifier 147. A flexible leaf 148 is mounted on the grip 118 and positioned to close the switch 146, and thereby complete the circuit through the motor 112 when a trigger 149 is squeezed. This trigger 149 is slidably mounted on the tool housing 110, and preferably includes a set screw 151 which engages the flexible leaf 148 and causes it to close the switch 146 when the trigger is squeezed.

The trigger 149 is also operably connected to the clutch 113 in such a manner as to cause the clutch to become engaged before the switch 146 is closed. The clutch 113 includes a generally cylindrical driving member 156 mounted for axial movement on a drive stud 157. The stud 157 is splined, and the inner periphery of the driving member 156 includes ribs 155 which extend into the splines, so that the driving member 156 may move axially relative to the stud 157 but not circumferentially.

The driving member 156 is journalled in a clutch sleeve 158 and has an annular groove 159 formed in its outer periphery substantially midway between its forward and rearward faces. The rounded upper end of a lever 161 is positioned within the groove 159, the lever 161 being pivotally mounted on the clutch housing 117 by a pin 162. The lower end of the lever 161 is connected to the trigger 149 by means of a connection with tension rod 163 and an adjustment nut 165. A compression spring 164 is positioned around the rod 163 between the nut 165 and the trigger 149, and urges the rod 163 in the rearward direction. However, a flange 166 on the rod 163 limits the rearward movement of the rod 163. By the foregoing construction when the trigger 149 is squeezed, the lever 161 pivots in the clockwise direction as viewed in FIG. 5, and moves the driving member 156 of the clutch 113 toward the right (as shown in FIG. 5) relative to the stud 157 and the tool housing 110 in order to cause the clutch 113 to become engaged, as will be described in greater detail hereinafter.

Rotary motion from the motor 112 is imparted to the stud 157 and the driving member 156 through a planetary gear system, comprising a drive pinion gear 170 formed on the right end of the armature shaft 121, and an internal ring gear 171 secured to the gear housing 117 in coaxial relation with the drive pinion gear 170. A pair of idler gears 172 and 173 are positioned in meshed relation with the drive pinion gear 170 and the internal ring gear 171, and are rotatably mounted on pins 174 carried by an idler gear carrier 177. This gear carrier 177 is rotatably mounted on the right end of the armature shaft 121 by a ball bearing assembly 178. The idler gear carrier 177 is rigidly secured to the rearward end of the drive stud 157, with the result that when the armature shaft 121 rotates, the idler gears 172 and 173 travel around it and thereby impart motion to the carrier 177, the drive stud 157, and the driving member 156 of the clutch 113.

The clutch 113 also includes a driven member 180 which is rigidly secured to a short cylindrical spindle 181. The driving member 156 and the driven member 180 respectively have clutch jaws 182 and 183 formed on their adjacent faces, these clutch jaws 182 and 183 being positioned to engage each other when the driving member 156 is moved toward the right by squeezing the trigger 149 as previously explained. In this form of the invention, a plurality of clutch jaws are preferably formed on each of the members 156 and 180. In this instance, three jaws are shown on each members. Each clutch jaw extends over an arc of approximately 35° and, since there are three jaws on each member, the maximum angular separation of adjacent jaws of the two members is approximately 80°. When the driving member 156 is in its forward position and the motor 112 is initially energized, the driving member 156 will again turn a partial revolution before the clutch jaws engage in the event the jaws are not already in engagement.

The outer peripheries of both the driving and driven members 156 and 180 of the clutch are journaled in the sleeve 158 and the forward end of the spindle 181 is rotatably supported by a needle bearing 185 in a chuck holder 184 which forms part of the tool housing 110. This chuck holder 184 is held rigid with the field housing 116 by a magnet sleeve 186, a clamp nut 187, a clamp sleeve 188, and the clutch housing 117. The clamp sleeve 188 is threaded into the housing 117, the magnet sleeve 186 is secured to the clamp sleeve 188 by tightening the clamp nut 187 and the sleeve 186 is secured by a press fit to the chuck holder 184.

The mandrel 111 may be identical to the mandrel 11 shown in FIGS. 1 and 2, and includes the spindle 181. A pin 192 is mounted on the forward end of the spindle 181 and extends through an opening which also receives the tang 191 of the mandrel 111, and secures the mandrel 111 against rotation relative to the spindle 181. The mandrel 111 is positioned within a tubular sleeve 193 which is held by a chuck assembly 194, this assembly 194 in turn being secured to the chuck holder 184 by a press fit. A pin 195 is again fastened to the chuck assembly 194 and engages the sleeve 193, the pin 195 ensuring proper alignment of the sleeve 193 relative to the chuck assembly 194. The forward end of the mandrel 111 and the sleeve 193 may be constructed identically with the corresponding members shown in FIG. 1 in order to engage a wire and wrap it around a terminal upon rotation of the mandrel 111 relative to the sleeve 193.

The indexing means 114 may also be identical in principle with the indexing means shown in FIG. 1, and comprises coaxial inner and outer magnets 200 and 201, the outer magnet 201 being secured to the magnet sleeve 186, and inner magnet 200 being secured to the outer periphery of the spindle 181. The rearward face of the inner magnet 200 has notches 203 (FIG. 7) formed therein which receive projections 204 formed on the hub of the driven clutch member 180 the projections and notches preventing rotation of the driven clutch member 180 relative to the spindle 181 and the inner magnet 200.

Prior to a wire wrapping operation, the trigger 149 is in the extended position shown in FIG. 5 due to the force exerted by the spring leaf 148, and the clutch jaws 182 and 183 of the driving and driven members of the clutch 113 are axially spaced from each other. The tool operator positions to the end of a wire to be wrapped into the slot at the periphery of the shaft 111 and a terminal into the center opening of the shaft 111. When the operator squeezes the trigger 149, the lever 161 rotates clockwise which moves the driving member 156 of the clutch axially toward the driven member 180 to the point where the clutch jaws 182 are able to engage the jaws 183. The set screw 151 is adjusted so that the clutch jaws are brought into engagement before the switch 146 is closed. In the event the jaws 182 of the driving member 156 engage or strike the tops of the jaws 183 of the driven member 180 rather than traveling the full engaged distance, the spring 164 of the trigger 149 compresses. This permits the trigger 149 to move further toward the left and close the switch 146, which energizes the motor 112. Partial rotation of the driving member 156 moves the jaws 182 off of the tops of the jaws 183. The spring 164 serves the additional function of providing additional tension to further engage the clutch jaws 182 and 183 after the switch 146 is closed.

When the motor 112 is energized and the clutch 113 is engaged, the mandrel 111 rotates relative to the sleeve 193 and the wire is wrapped around the terminal as previously explained. When the wire wrapping operation is completed, the operator releases pressure on the trigger 149 and it again moves to its extended position due to the force exerted by the leaf 148. The switch 146 opens and counterclockwise rotation of the lever 161 moves the clutch jaws 182 and 183 out of engagement. The inner and outer magnets 200 and 201 of the indexing means 114, which have their poles oriented in the same manner as the poles shown in FIG. 1, again being the mandrel 111 to its starting position relative to the sleeve 193. Further, the clutch completely disconnects the motor 112 from the spindle 181 and the mandrel 111, so that inertia or friction of the motor 112 cannot affect the operation of the indexing means 114.

Also, for the convenience of the operator the angular position of the mandrel 111 and the sleeve 193 may be varied relative to the field housing 116 and the clutch housing 117 by loosening the clamp nut 187 and rotating the chuck holder 184 to the desired position. Again, however, the sleeve 193 will always maintain a predetermined angular position relative to the mandrel 111.

The clutch arrangement of the embodiment shown in FIGS. 5 and 6 may be preferred inasmuch as the clutch jaws are immediately and completely disengaged upon release of the trigger 149 which results in complete and immediate disengagement of the indexing magnets from driving motor. Thus, in this embodiment when the magnets are restoring the mandrel to its rest position, they are not required in any way to rotate the armature, and, consequently, the magnets may be smaller, having less inertia, and come to rest in the starting position in less time.

From the foregoing it will be apparent that the indexing means above described in connection with a wire wrapping tool may be utilized in connection with power operated screw drivers, nutsetters and the like. For example, in the case of the screw driver it may be desired to start the screwing operation with the slot engaging blade in a predetermined position relative to the hool housing and relative to the slot of the screw head so that the slot and the blade may be aligned, thus, the indexing means may restore the blade to the predetermined starting position at the end of each cycle of operation. Similarly, with a nutsetter the work engaging socket may likewise be restored to a predetermined starting position relative to a nut in order to facilitate mating alignment therewith.

It should also be apparent that other types of drive units such as an air motor or a hydraulic motor may be provided for the tool rather than an electric motor. While permanent magnets have been shown, obviously electromagnets can also be used. Further it is not necessary that coaxial ring magnets be used. For example, two axially spaced and polarized rod magnets could also be used. The only requirement is that one magnet be movable with the mandrel and the other magnet be stationary relative to the sleeve around the mandrel, and that there be one position of the movable magnet toward which it is urged by the coaction of the fields of the two magnets.

We claim:
1. A tool for wrapping a length of wire around a terminal, comprising a hollow sleeve, a mandrel rotatably mounted within said sleeve, the forward ends of said mandrel and said sleeve being shaped to engage said wire and wrap said wire around said terminal upon rotation of said mandrel relative to said sleeve, said mandrel having a starting position relative to said sleeve due to the construction of their forward ends, and indexing means for urging said mandrel toward said starting position, said indexing means comprising a first magnet operably engaged with said mandrel for rotation therewith and a stationary second magnet mounted in fixed position relative to said first magnet, the magnetic poles of said first and second magnets being arranged such that the magnetic fields coact to urge said mandrel to said starting position, said first and second magnets being positioned adjacent each other, and the magnetic poles of each of said magnets being at opposite sides of the axis of said sleeve and said mandrel, said first magnet being positioned coaxially with said second magnet, each of said first and second magnets being in the shape of a ring, and said first magnet being positioned coaxially with and within said second magnet.

2. A tool for wrapping a length of wire around a terminal, comprising a housing, a rotary member mounted on said housing, said member being adapted to engage said length of wire and wrap the wire around said terminal upon rotation of said member, and indexing means for bringing said member to a starting position relative to a portion of said housing, said indexing means comprising a first magnet operably engaged with said member for movement therewith and a second magnet mounted in fixed position relative to said first magnet, the magnetic poles of said first and second magnets being arranged such that the magnetic fields coact to urge said member to the starting position, said member being rotatably mounted on said housing, and said first magnet comprising a cylindrical permanent magnet positioned coaxially with said member, the magnetic poles of said first magnet being adjacent its outer periphery and on opposite sides of said member, and said second magnet comprising another permanent magnet secured to said housing adjacent said first magnet, said second magnet being positioned around said first magnet in coaxial relation, and the magnetic poles of said second magnet being adjacent its inner periphery and on opposite sides of said member.

References Cited by the Examiner

UNITED STATES PATENTS

| 2,099,849 | 11/1937 | Holmes | 310—97 X |
| 2,188,941 | 2/1940 | Eden. | |
| 2,732,139 | 1/1956 | Shaff | 242—7 |
| 2,826,920 | 3/1958 | Barnes et al. | 242—7 |
| 2,884,685 | 5/1959 | Bos et al. | 242—7 |
| 2,927,741 | 3/1960 | Moore et al. | 242—7 |
| 3,070,730 | 12/1962 | Gray et al. | 317—171 |
| 3,172,512 | 3/1965 | Allen et al. | 242—7 X |
| 3,172,516 | 3/1965 | Moore | 242—7 X |
| 3,172,517 | 3/1965 | Moore | 242—7 X |

MERVIN STEIN, *Primary Examiner.*

D. E. WATKINS, *Assistant Examiner.*